Oct. 6, 1942.  J. H. McNABB  2,298,144
PHOTOGRAPHIC CAMERA AND CARRYING CASE THEREFOR
Filed Aug. 15, 1939  2 Sheets-Sheet 1
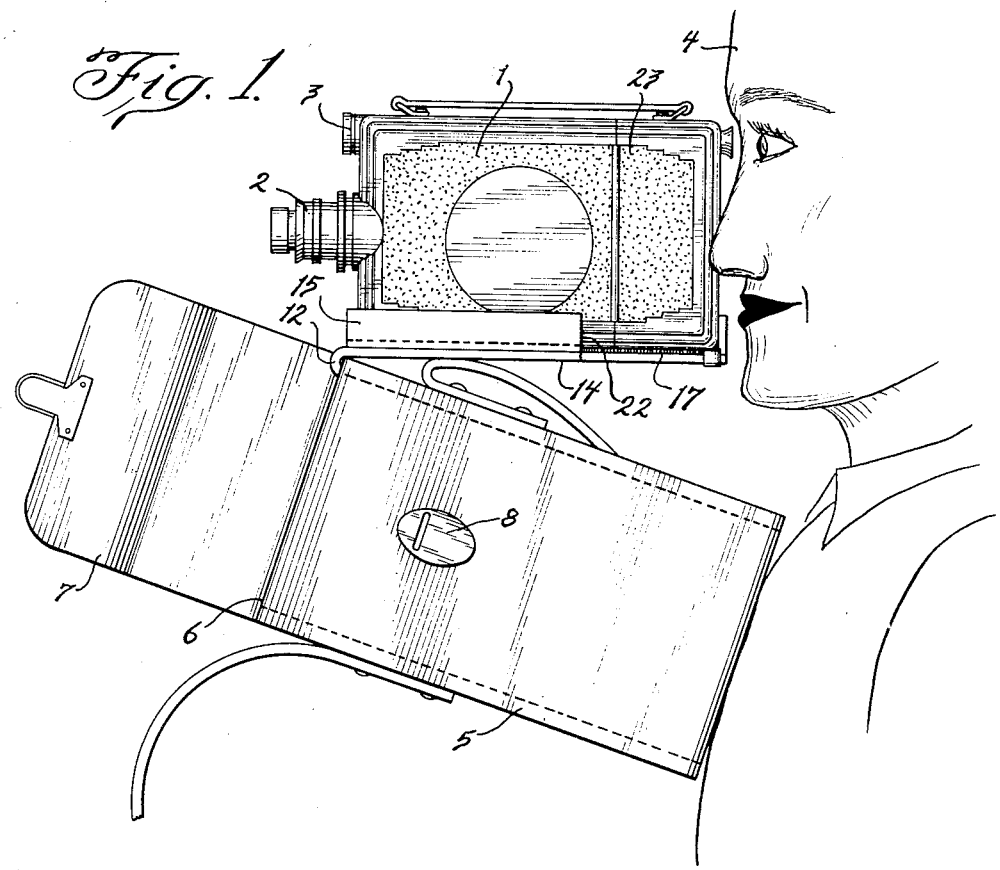
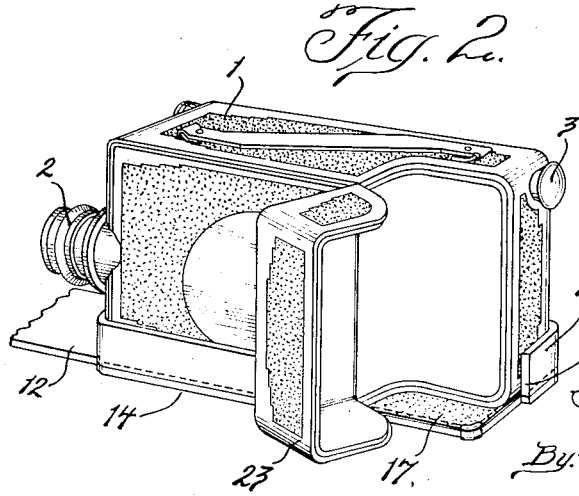
Inventor:
Joseph H. McNabb
By: Robert F. Miehle
Atty.

Oct. 6, 1942.   J. H. McNABB   2,298,144
PHOTOGRAPHIC CAMERA AND CARRYING CASE THEREFOR
Filed Aug. 15, 1939   2 Sheets-Sheet 2
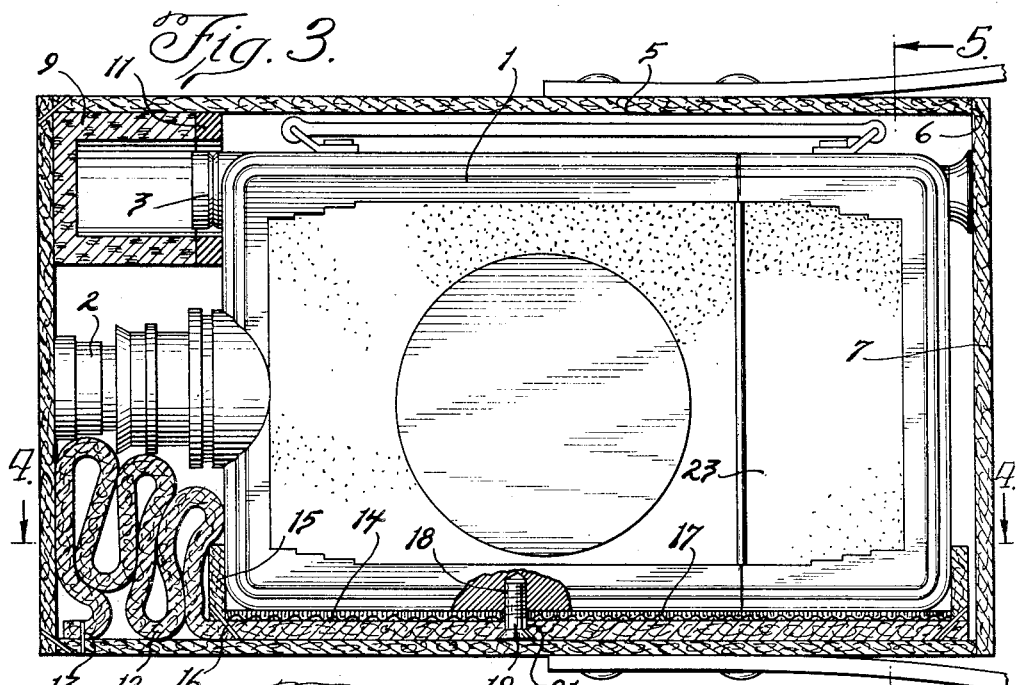
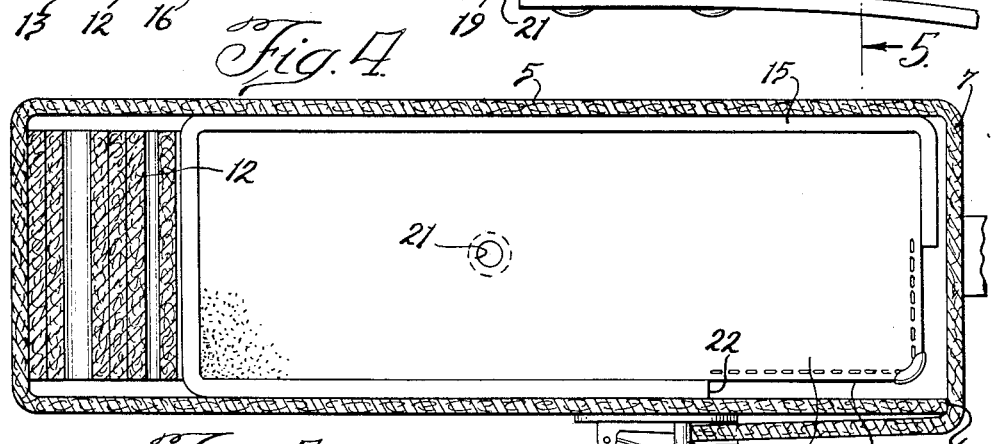
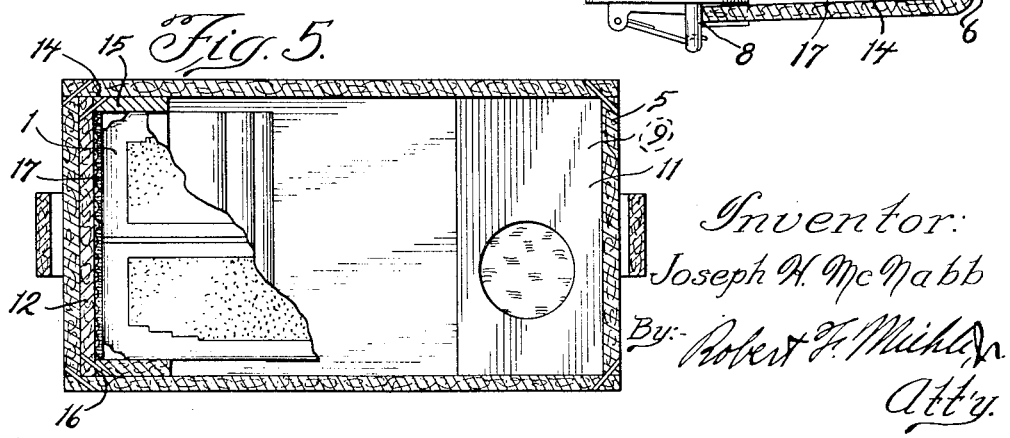
Inventor:
Joseph H. McNabb
By: Robert F. Mihl Jr.
Att'y.

Patented Oct. 6, 1942

2,298,144

UNITED STATES PATENT OFFICE 2,298,144

PHOTOGRAPHIC CAMERA AND CARRYING CASE THEREFOR

Joseph H. McNabb, Winnetka, Ill., assignor to The Bell & Howell Company, Chicago, Ill., a corporation of Illinois Application August 15, 1939, Serial No. 290,266

2 Claims. (Cl. 95—86)

My invention relates particularly to a motion picture camera of the hand or "field" type and a carrying case therefor and has for a major object the provision of connecting means, preferably in the form of a flexible strap, between the camera and carrying case whereby upon removal of the camera the case is utilized as a support for the camera, particularly with reference to the case engaging against a user's breast for support when the camera is held in a conventional operating position in front of the user's face for viewing while photographing.

With this object in view my invention consists in certain features of novelty in the construction, combination, and arrangement of parts by which the said object and certain other objects, hereinafter appearing, are effected all as fully described with reference to the accompanying drawings, and more particularly pointed out in the appended claims.

In the said drawings—

Figure 1 is a side elevation of a motion picture camera and carrying case embodying my invention and showing the camera in case supported photographing position in front of a user's face;

Figure 2 is a perspective view of the camera open for loading and showing a portion of the structure of my invention attached to the camera;

Figure 3 is a vertical section of the camera case with the camera inserted therein;

Figure 4 is a horizontal sectional view of the case substantially on the line 4—4 of Figure 3; and Figure 5 is a vertical sectional view substantially on the line 5—5 of Figure 3 and with the camera partially broken away.

Referring to the drawings, I designates a typical forwardly and rearwardly elongated motion picture camera of the hand or "field" type provided with a photographic lens 2 and a view finder 3 extending in parallelism with the lens 2, the camera, when not mounted on a tripod not shown, being held by the hands of a user 4 in front of his face with an eye alined with the view finder for viewing while photographing. See Figure 1.

A relatively rigid correspondingly elongated carrying case 5 for the camera is provided with an end opening 6 for corresponding insertion and removal of the camera 1, and is provided with a hingedly related closure 7 for the opening 6 which closure is releasably held in closed position by a releasable latch 8, as is usual in leather camera cases as shown. When the camera 1 is inserted in the case 5, see Figure 3, the photographic lens 2 engages the closed end of the case opposite the opening 6 and a hollow structure 9 provided with a rearwardly facing yieldable element 11 surrounds the projecting front end of the view finder 3 and engages the camera proper, both these engagements limiting insertion movement of the camera and cooperating with the closure 7, when closed, to longitudinally position the camera in the case. When the closure 7 is in open position, as shown in Figure 1, the camera may be inserted and removed from the case.

A flat flexible strap 12, say of leather, has one end thereof secured, as designated at 13, in the interior of the case 5 in the region of the end thereof remote from the opening 6. The strap 12 is of suitable length and at its other end is provided with a tray formation 14 comprising the corresponding end portion of the strap and a surrounding flange 15, preferably of leather and stitched to the strap as designated at 16. The tray formation 14 is shaped to embrace the bottom portion of the camera and hold the camera angularly in a horizontal plane, and the bottom portion of the tray formation is preferably faced with a soft material 17, such as velour, for engagement with the bottom of the camera.

The camera is provided with a conventional screwthreaded tripod mount bore 18 in the bottom thereof and a headed screw 19 passes through a bore 21 in the strap 12 and is screwthreaded into the bore 18 to detachably secure the camera with the strap, so that the camera may be used independently of the strap and case. Accordingly, the strap is secured with the bottom of the camera flatwise thereof and extending forwardly therefrom.

The flange 15 of the tray formation 14 is interrupted, as designated at 22, so that a hinged door 23 of the camera may be opened and closed for loading and unloading the camera with film without necessitating removal of the tray formation from the camera. See particularly Figure 2.

When the camera is inserted in the case, as shown in Figure 3, the strap 12, being secured with the case on the interior thereof, is also enclosed in the case.

When the camera is removed from the case, the connections of the strap 12 with the camera and case are so related that the strap may be flexed about the edge of the opening 6 and the corresponding corner of the case to position the case with the lower front portion of the camera secured with this corner of the case against rearward movement of the camera with reference to the case and with the case extending rearwardly downward from the camera to form a support therefor engaging against the user's breast for support when the camera is held in operating position in front of the user's face, as shown in Figure 1, thus providing a support supplementing the user's hands holding the camera with resulting ease in holding the camera steady while photographing.

While I have thus described my invention, I do not wish to be limited to the precise details described as changes may be readily made without departing from the spirit of my invention, but having thus described my invention I claim as new and desire to secure by Letters Patent the following:

1. The combination with a forwardly and rearwardly elongated photographic camera and a correspondingly elongated carrying case therefor open at one end for corresponding insertion and removal of the camera, of a flexible strap spacedly connected with the camera and case and permitting insertion and removal of the camera with reference to the case and secured with the case on the interior thereof remote from said opening and secured with the bottom of the camera and extending forwardly therefrom and engageable about a corner of the case at said open end with the camera above the case to secure the camera against rearward movement with reference to the case.

2. The combination with a forwardly and rearwardly elongated photographic camera provided with a screw-threaded tripod mount bore in the bottom thereof and a correspondingly elongated carrying case for the camera and open at one end for corresponding insertion and removal of the camera, of a flat flexible strap spacedly connected with the camera and case and permitting insertion and removal of the camera with reference to the case and secured with the case on the interior thereof remote from said opening and secured with the bottom of the camera flatwise thereof and extending forwardly therefrom and engageable about a corner of the case at said open end with the camera above the case to secure the camera against rearward movement with reference to the case, and the securing of said strap with the camera comprising a screw screw-threaded into said tripod mount bore.

JOSEPH H. McNABB.